United States Patent [19]

Akimoto et al.

[11] 4,031,185

[45] June 21, 1977

[54] PROCESS FOR MAKING NITROGEN OXIDES CONTAINED IN FLUE GAS HARMLESS

[75] Inventors: Hidetoshi Akimoto, Ibaraki; Ryuichi Kaji, Hitachi; Hideo Kikuchi, Hitachi; Yukio Hishinuma, Hitachi; Yoshijiro Arikawa, Hitachi, all of Japan

[73] Assignees: Hitachi, Ltd.; Babcock-Hitachi K.K., both of Japan

[22] Filed: Jan. 30, 1976

[21] Appl. No.: 653,949

[30] Foreign Application Priority Data

Feb. 3, 1975  Japan .............................. 50-14182
Feb. 8, 1975  Japan .............................. 50-16469
Feb. 8, 1975  Japan .............................. 50-16470

[52] U.S. Cl. ................................ 423/239; 423/351
[51] Int. Cl.² ........................................ B01D 53/34

[58] Field of Search ................ 423/239, 213.2, 351

[56] References Cited

FOREIGN PATENTS OR APPLICATIONS

| | | | |
|---|---|---|---|
| 245,110 | 12/1960 | Australia | 423/213.2 |
| 804,317 | 8/1973 | Belgium | 423/239 |
| 48,590 | 5/1974 | Japan | 423/239 |

*Primary Examiner*—G. O. Peters
*Attorney, Agent, or Firm*—Craig & Antonelli

[57] ABSTRACT

The present invention relates to a process for removing nitrogen oxides contained in a gaseous mixture such as combustion flue gas, etc. by reduction of the nitrogen oxides with ammonia, and a cuprous or cupric halide is used as a catalyst to carry out the reduction in a low temperature range. As a result, nitrogen oxides can be satisfactorily removed by the reduction even at about 150° C.

20 Claims, 5 Drawing Figures

PROCESS FOR MAKING NITROGEN OXIDES CONTAINED IN FLUE GAS HARMLESS

This invention relates to a process for making nitrogen oxides contained in a gaseous mixture such as combustion flue gas, etc. harmless, and more particularly to a process for catalytically reducing nitrogen oxides with ammonia.

Nitrogen oxides, mainly NO and $NO_2$, exist in combustion flue gases evolving when fossil fuel is burned as in a power plant, etc., or in flue gases from many metal refineries and chemical factories, for example, sintering furnaces, metal surface treatment, heating furnaces, and nitric acid plants. When a large volume of the flue gas containing these nitrogen oxides is discharged to the atmosphere, the state or local community organization sets forth environmental standards against the nitrogen oxides to make strict control on the discharge of such flue gas at every generation source, because such a large volume of the flue gas exceeds the purifying capacity of nature and considerably impairs the human health. The only way to meet these environmental standards or discharge controls is to convert the nitrogen oxides contained in the flue gas to harmless compounds, for example, nitrogen and oxygen, or remove the nitrogen oxides from the flue gas. Most of the nitrogen oxides contained in the flue gas (nitrogen oxides will be hereinafter referred to as $NO_x$) are not oxidized to $NO_2$ in the combustion flue gas, and exist in the form of NO.

$NO_x$ concentration is, in the case of boiler flue gases from the power plant, etc. 200–400 ppm in the fuel oil combustion flue gas, 50–300 ppm in the gas combustion flue gas, and 400–600 ppm in the coal combustion flue gas, and is 200–400 ppm in the sintering furnace flue gas and 1,000–3,000 ppm in the nitric acid plant flue gas. In addition, the flue gas usually contains oxygen and water in the order of a few percentage.

Problems in making $NO_x$ in these flue gases harmless are that a very large volume of the flue gas must be treated, and reactivity of $NO_x$ is very poor. Consequently, an apparatus for making $NO_x$ harmless becomes larger, which incurs a great expense. Thus, no commercial scale operation has been yet in practice.

Many researches have been made for making $NO_x$ harmless. As dry processes, where reaction is carried out on a dry basis, there are available a direct decomposition process, a catalytic reduction process and an adsorption process. The direct decomposition process comprises decomposing $NO_x$ at an elevated temperature, using a catalyst, but its reaction temperature is higher than 500° C, and its reaction rate is low. Thus, its practical application is hardly realizable at the present stage.

The catalytic reduction process provides both a method for catalytically reducing $NO_x$ over a catalyst to nitrogen and water, using carbon monoxide, hydrogen, methane, etc. as a reducing agent, and a method for making the similar treatment, using ammonia. The former method is applied to a nitric acid plant, etc. where $NO_x$ concentration is high, and a relatively small volume of the flue gas is treated, but the reducing agent preferentially undergoes reaction with oxygen that is usually contained in the flue gas in the order of a few percentages, and after the reaction with the oxygen, the reducing agent starts to react with $NO_x$. Thus, a large amount of the reducing agent is required, rendering the process very uneconomical.

The latter method is suitable to the flue gas treatment, because of selective reaction of ammonia with $NO_x$ and no consumption of the reducing agent by the oxygen existing in the flue gas as a consequence.

The adsorption process comprises catching $NO_x$ on the surfaces of the adsorbent such as activated carbon, molecular sieve, zeolite, etc., but has such disadvantages as disturbances by the coexisting gases such as water, etc., and complicated steps of desorption and regeneration.

As wet processes, there are available a process comprising oxidizing $NO_x$ with ozone, potassium permanganate, sodium perchlorate, hydrogen peroxide, etc., followed by absorption, a process comprising absorbing $NO_x$ into water or an alkali agent, and a process comprising reducing $NO_x$ with sulfite, etc., followed by absorption, but any of the processes has such problems as slow reaction rate, complicated treatment with water after the reaction, and poor economy. In addition, there are available a process based on irradiation of radioactive rays and a process based on utilization of ultrasonic waves, but the facility cost for these processes is high and there are many problems in commercial practice of these processes.

An object of the present invention is to increase a reaction rate of ammonia with $NO_x$ in a dry ammonia catalytic reduction process, using a novel catalyst, and make the reduction reaction possible in a low temperature range.

Another object of the present invention is to provide simple preparation of the catalyst.

Heretofore, noble metal catalysts such as platinum, palladium, ruthenium, etc. and metallic oxide catalysts such as iron oxide, chromium oxide, cobalt oxide, copper oxide, molybdenum oxide, etc. have been developed as the catalysts applicable to the ammonia catalytic reduction process. In carrying out the catalytic reduction of $NO_x$ with ammonia using these catalysts, a reaction temperature as high as 250° to 400° C is required, and consequently an additional heat source is required, rendering the process economically disadvantageous. Therefore, attempts have been made to lower the reaction temperature, and a process for carrying out the ammonia catalytic reduction reaction at a temperature as low as 100°–150° C, using activated carbon as the catalyst and utilizing the catalytic action of the activated carbon has been recently reported. However, where a sulfur dioxide gas coexists, as in the case of fuel oil combustion flue gas, oxidation and adsorption of the sulfur dioxide gas take place, and a continuous reduction operation becomes difficult to effect in that case. Further, the strength of the activated carbon is a problem.

The present invention provides a process for carrying out catalytic reduction of $NO_x$ with ammonia at a low temperature range of 100° to 150° C, where any cheap catalyst carrier having an excellent property of strength can be used upon free selection besides the activated carbon, so long as the carrier has a large surface area and large pore volume. According to the present invention, a metal halide, especially copper halide, preferably cuprous or cupric chloride, is supported on a carrier such as silica gel, active alumina, silica.alumina gel, etc., and it is then possible to reduce $NO_x$ contained in the flue gas with ammonia at a temperature of 100° C or higher, using the catalyst as mentioned above as a catalyst for the catalytic reduction.

Heretofore, a higher reaction temperature such as 250° to 450° C has been required for reducing $NO_x$ with ammonia, using the noble metal or metallic oxide as the catalyst, because $NO_x$ or ammonia is much more activated at such a higher temperature, and the reaction is accelerated thereby. Therefore, the level of activation is lowered at a lower temperature, and the reaction is retarded. To accelerate the reaction at a lower temperature, it is necessary to activate the reacting materials at the other temperature than the reaction temperature. It seems that the reason why the reduction reaction proceeds even at a lower temperature with the activated carbon is that the activated carbon itself has a function to activate the reacting materials. However, the use of the activated carbon has problems of strength of the activated carbon, oxidation of the activated carbon by oxygen contained in the flue gas, complications in catalyst regeneration due to the adsorption of sulfur dioxide gas when the flue gas contains sulfur dioxide, etc.

The present inventors have made studies of the activation of reacting materials by some other means, and have found, as a result, that metal halides, desirably copper halides, are very effective for the activation of the reacting materials.

It is known that $NO_x$ can undergo coordination with many metal compounds to form metal complexes. The present inventors have taken notice of this fact. The present inventors have presumed that the coordination of $NO_x$ with the metal compounds can activate $NO_x$ and further promote reaction of $NO_x$ with ammonia at a lower temperature to convert $NO_x$ to harmless nitrogen and water. To prove this presumption correct, the present inventors have conducted the following measurement.

Various metal compounds are added to carriers of silica gel ($SiO_2$ 100%, pore volume of 0.4 cc/g, surface area 150 m²/g), and 300 ppm of ammonia is added to a flue gas containing $NO_x$, mainly NO and $NO_2$, in which NO takes the most portion of $NO_x$, 300 ppm of nitrogen monoxide, 12% of carbon dioxide, 10% of water, and 3% of oxygen, the balance being nitrogen. The resulting flue gas is passed through a packed bed of the catalyst to cause reaction. By measuring $NO_x$ concentrations at the inlet and outlet of the packed bed of the catalyst, a percent $NO_x$ removal through the packed bed of the catalyst ($NO_x$ concentration at the inlet - $NO_x$ concentration at the outlet)/($NO_x$ concentration at the inlet) is determined. As a result, it has been found that the $NO_x$ reduction hardly takes place with a single silica gel, but $NO_x$ reduction takes place at a very low reaction temperature such as about 100° C with silica gels supporting metal halides, especially cuprous or cupric halides such as CuCl, CuBr, $CuCl_2$, $CuBr_2$, etc. Suppose $NO_x$ in the flue gas is represented by NO, because NO takes the most portion of $NO_x$ in the flue gas, it can be presumed that NO at first undergoes coordination with the copper halide to form a nitrosyl complex in the reaction as given by the following formula (1):

$$CuX_2 + NO \rightarrow CuX_2 \cdot NO \qquad (1)$$

where X is Br or Cl.

Then, the nitrosyl complex reacts with ammonia at a lower temperature to convert NO to harmless nitrogen and water, as given by the following formula (2):

$$CuX_2NO + NH_3 + \tfrac{1}{4} O_2 \rightarrow CuX_2 + N_2 + 3/2 H_2O \qquad (2)$$

That is, NO is activated by the formation of nitrosyl complex, and the reaction can be carried out at the lower temperature thereby.

Said catalyst components are cheap, popular industrial chemicals, and can be used as filling them as such in containers or shaping their powders into a desired shape, but it is advantageous to support the catalyst components on a porous carrier, for example, silica gel, silica-alumina gel, alumina, activated carbon, etc. and use the catalyst components supported on the carrier, because no scattering of the catalyst component powders takes place, and the contact area with the flue gas is increased, thereby reducing the amount of the catalyst component to be used.

The catalyst components of the present invention are all very water-soluble salts, except monovalent copper halides, and therefore the carriers can be used as the catalyst only by dipping the carriers in their aqueous solutions and drying the carriers. That is, the supporting operation is very simple.

As a result of further studies of improving the catalyst activity, the present inventors have also found that the coexistence of an ammonium salt with the copper halide can improve the catalyst activity. By applying a mixed solution or slurry of the ammonium salt and the catalyst component to the porous carrier, a good coexisting state of the ammonium salt and the catalyst component can be obtained. It has been found that $NO_x$ in the flue gas more rapidly reacts with the ammonia in the ammonium salt than the ammonia gas added to the flue gas, and the conversion is much more enhanced thereby. The ammonia-freed catalyst turns acidic, and thus is liable to be combined with the ammonia added to the flue gas to form the ammonium salt again. Therefore, no ammonia is discharged from the outlet of the catalyst bed, unless the ammonia is added especially in excess to the flue gas.

Since the reaction of nitrogen monoxide with the ammonium salt becomes remarkable in the coexistence of a very small amount of oxygen (in the same order as the NO concentration) in the present process, it can be presumed that the nitrogen monoxide is adsorbed and oxidized on the catalyst surface, and the oxidized product reacts with the ammonia in the ammonium salt existing at a high concentration around the catalyst components. Usually, a few percentages of oxygen is contained in the combustion flue gas, but the coexistence of such oxygen never hinders the application of the present invention.

The foregoing embodiment is directed to an improvement of the present $NO_x$ removal, but shows that the control of an amount of ammonia to be added can be relaxed, depending upon conditions. For example, when ammonium sulfate is used as the ammonium salt, it is presumed that the reaction proceeds through the following steps:

$$4NO + O_2 + 4(NH_4)_2SO_4 \rightarrow 4N_2 + 6H_2O + 4NH_4HSO_4 \qquad (3)$$

$$4NO + O_2 30\ 4NH_4HSO_4 \rightarrow 4N_2 + 6H_2O + 4H_2SO_4 \qquad (4)$$

When the catalyst bed temperature is below 150° C, $NH_4HSO_4$ formed according to the formula (3) is not melted, and thus the reaction can proceed as far as the formula (4) without preventing the NO adsorption of the catalyst. $H_2SO_4$ is hardly evaporated at that temperature. Therefore, the percent $NO_x$ removal is not lowered even by adding ammonia in a smaller amount than the reaction amount to the flue gas or adding no ammonia at all at the beginning. Furthermore, even by adding the ammonia in a considerably excessive amount when the percent $NO_x$ removal starts to decrease, the added ammonia is liable to be absorbed in $NH_4HSO_4$ or $H_2SO_4$, and is never discharged from the catalyst bed until the formation of $(NH_4)_2SO_4$ is almost completed. By repeating such operations, $NO_x$ removal can be conducted without any discharge of ammonia from the catalyst bed and without lowering the percent $NO_x$ removal.

A compound selected from vanadium compounds and molybdenum compounds can be used in place of the ammonium salt.

The vanadium compounds include various vanadium compounds, for example, vanadium oxides such as vanadium pentoxide ($V_2O_5$), vanadium oxyhalides such as vanadyl dichloride ($VOCl_2$) and vanadyl tetrachloride ($VOCl_4$), and (meta)yanadates such as ammonium metavanadate ($NH_4VO_3$), but ammonium salt of (meta)yanadate is especially preferable.

The molybdenum compounds include various molybdenum compounds, for example, molybdenum oxides, such as molybdenum trioxide ($MoO_3$), molybdenum halides such as molybdenum pentachloride ($MoCl_5$), molybdenum oxyhalides and molybdates such as ammonium molybdate ($(NH_4)_6Mo_7O_{24}$), and ammonium molybdate is especially preferable.

The vanadium compound and the molybdenum compound are usually used singly, but can be used together.

Furthermore, it has been found that further addition of an alkali metal halide, above all, the cheapest sodium chloride, can much more improve the catalyst performance. The ternary catalyst can be prepared by dissolving cupric chloride, ammonium sulfate and sodium chloride in water, dipping silica gel into the resulting aqueous solution to sufficiently impregnate the gel with the solution, and drying the gel. It is presumed that the coexistence of excess chloride ions from sodium chloride prevents an occurrence of ion exchange reaction in the solution, which converts a portion of cupric chloride to cupric sulfate of poor activity.

Figure 1:
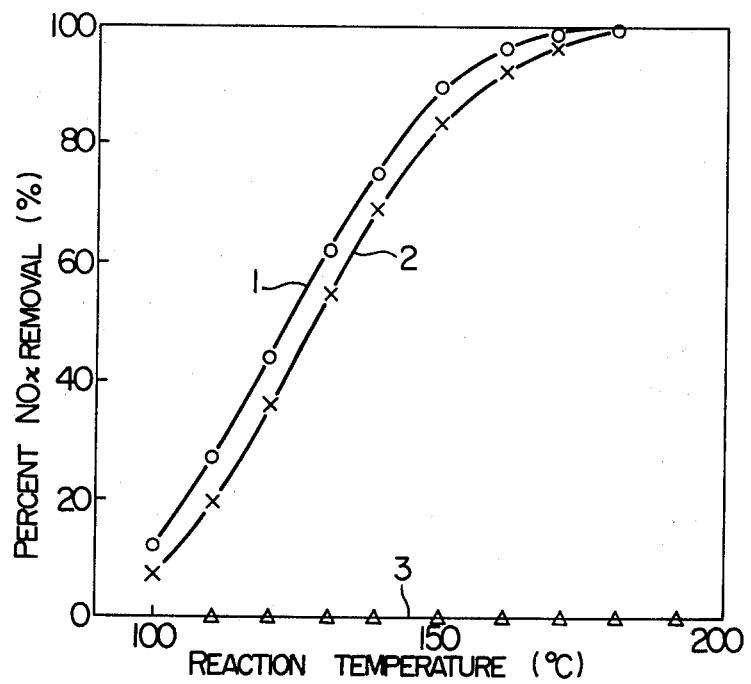
FIG. 1 is a graph showing relations between reaction temperature and percent $NO_x$ removal of the present catalyst in the presence or absence of $NH_3$.

Experimental results showing the function and effect of various catalysts of the present invention are given below Catalysts are prepared by impregnating dried alumina gels of 12 to 14 mesh consisting of 90% $Al_2O_3$ and 10% $SiO_2$ as carrier individually with solutions containing 5% by weight of copper halides given in Table 1 (in the cases of CuCl and CuBr, suspensions because their solubilities are low, for example, in the order of 0.01%), and drying the individual impregnated carriers at 120° C. The resulting individual catalysts are filled in reactor tubes, and the reaction section is heated and maintained at 150° C. A gas containing $NO_x$ and ammonia is passed through the individual reactor tubes at a space velocity of 2,000 $hr^{-1}$, and percent $NO_x$ removal ($NO_x$ is a total of NO and $NO_2$) is determined one hour after the start to pass the gas through the reactor tubes. The results are given in Table 1.

Table 1

| Catalysts | Percent $NO_x$ removal (%) |
|---|---|
| CuCl | 98 |
| CuBr | 99 |
| $CuCl_2$ | 100 |
| $CuBr_2$ | 100 |
| $CuI_2$ | 93 |
| $Cu(NO_3)_2$ | 82 |
| $CuSO_4$ | 70 |
| Only carrier | 0 |

Composition of the gas used in the experiments is given below:

| | |
|---|---|
| NO | 250 – 300 ppm |
| $NH_3$ | 300 – 350 ppm |
| $O_2$ | 3 % |
| $H_2O$ | 10 % |
| $N_2$ | balance |

The $NO_x$ concentration is measured by a chemiluminescence type analyzer. The percent $NO_x$ removal is given by the following formula:

$$\frac{NO_x \text{ concentration at inlet} - NO_x \text{ concentration at outlet}}{NO_x \text{ concentration at inlet}} \times 100\%$$

It is seen from the experimental results of Table 1 that only the carrier has no ability to remove nitrogen monoxide at all, and the effect of copper halides is distinguished, and especially its chlorides and bromides are effective on nitrogen monoxide removal.

It is shown in the following experimental results using other porous carriers and $CuCl_2$ as the copper halide that the effect of the copper halides is not peculiar to the carrier used above. As the carriers, silica gel, alumina, and activated carbon, each in 12–14 mesh, are used, and the experimental conditions are the same as above. Results are given in Table 2.

Table 2

| Carriers used | Percent $NO_x$ removal (%) |
|---|---|
| Silica gel | 78 |
| Alumina | 99 |
| Activated carbon | 97 |

Any of the catalysts based on these porous carriers has an ability to remove $NO_x$, and it can be presumed that differences in the percent $NO_x$ removal among the carriers are due to the differences in the amount of the catalyst component due to the differences in the porosity of the carriers, pore sizes and pore distribution. In the case of only carriers, only activated carbon shows a percent $NO_x$ removal of about 7% under the same conditions, and other carriers have no effect upon the $NO_x$ removal at all. The effect of copper halide upon the $NO_x$ removal is apparent also from these results.

Dependency of the $NO_x$ by the catalysts used in the present invention upon temperature and necessity for ammonia addition are described below, referring to cases using CuCl and $CuCl_2$.

Catalysts are prepared by impregnating the same alumina gel carriers as used above with a suspension containing 5% by weight of $CuCl_2$ or a suspension containing 5% by weight of CuCl, and drying the impregnated carriers at 120° C. The resulting catalysts are filled in reactor tubes and maintained at various temperatures. A gas containing 250 to 300 ppm of NO, 300 to 350 ppm of $NH_3$, 3% of $O_2$, 10% of $H_2O$, and the balance being $N_2$, and a gas containing 300 ppm of NO, 3% of $O_2$, 10% of $H_2O$ and the balance being $N_2$ are individually passed through the reactor tubes at a space velocity of 8,000 $hr^{-1}$. About 30 minutes after the catalysts have reached the stationary state at the given temperature, $NO_x$ concentration is measured to determine a percent $NO_x$ removal. The results are shown in FIG. 1. In FIG. 1, curve 1 is plotted for the $CuCl_2$ catalyst and curve 2 for the CuCl catalyst, and the gas containing ammonia is used as the test gas. Line 3 is plotted for the $CuCl_2$ catalyst, but the gas containing no ammonia is used as the test gas.

As is apparent from FIG. 1, $NO_x$ rapidly reacts with ammonia, and is removed from the gas with increasing temperature from about 100° C, if the gas contains ammonia, but $NO_x$ is not removed at all if the gas contains no ammonia. The carrier only as used in the foregoing experiments has no ability to remove nitrogen monoxide even in the presence of ammonia, as mentioned above, and thus the presence of ammonia as a reactant for $NO_x$ is indispensable in the present invention. It is seen that the reaction of ammonia is accelerated by the catalytic action of said copper salts.

Figure 2:
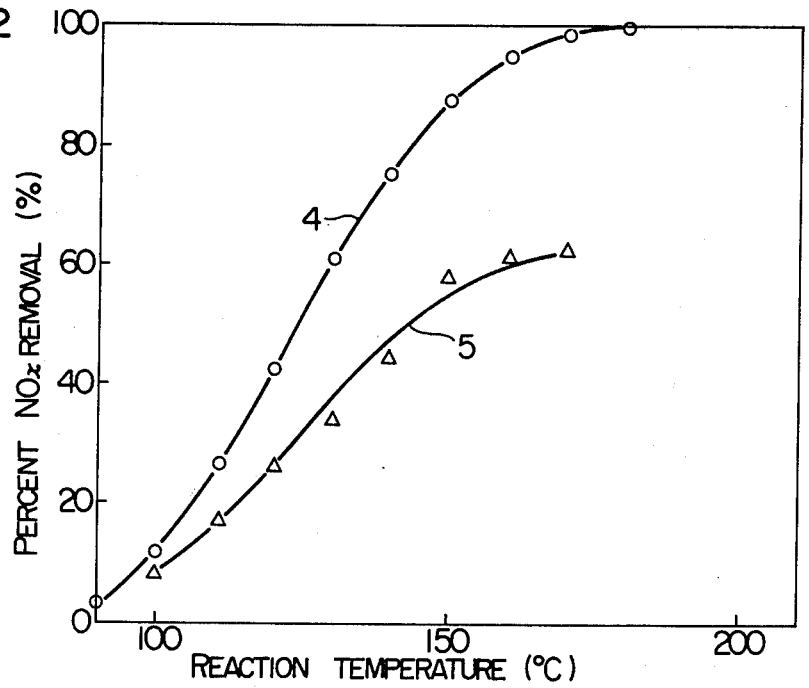
FIG. 2 is a graph showing relations between reaction temperature and percent $NO_x$ removal of the present catalyst in the presence or absence of $O_2$.

The present catalyst is characterized by containing a copper halide, and when a flue gas contains no oxygen at all in using such catalyst in the present process, the $NO_x$ removal is considerably reduced. That is, catalysts are prepared by impregnating the same alumina gel carriers as used above with a suspension containing 3.5% by weight of $CuCl_2$ and drying the impregnated carriers at 120° C. The resulting catalysts are filled in reactor tube, and maintained at various temperatures. A gas containing 300 ppm of NO, 300 ppm of $NH_3$, 3% of $O_2$, 10% of $H_2O$, and the balance being $N_2$, and a gas containing 300 ppm of NO, 300 ppm of $NH_3$, 10% of $H_2O$, and the balance being $N_2$ are individually passed through the reactor tubes at a space velocity of 8,000 $hr^{-1}$. About 30 minutes after the catalyst has reached the stationary state at the given temperature, $NO_x$ concentrations are measured to determine a percent $NO_x$ removal. The results are shown in FIG. 2. In FIG. 2, curve 4 is plotted for the gas containing 3% of $O_2$, and curve 5 for the gas whose $O_2$ content is 0%. It is seen from FIG. 2 that, if there is $O_2$ in the gas, the percent $NO_x$ removal is considerably increased.

The present invention will be described in detail below, referring to Examples.

EXAMPLE 1

Spherical alumina carriers in 4 – 6 mesh are impregnated with an aqueous solution containing 5% by weight of $CuCl_2$, and dried at 120° C. 10 l of the resulting catalyst is filled in a column, 150 mm in inner diameter. 1.5 l/hr of ammonia gas is added to 20 $Nm^3/hr$ of combustion flue gas containing 65 – 70 ppm of NO from an ammonia cylinder, and the resulting mixed gas is passed through the catalyst reactor column maintained at 145° C.

$NO_x$ concentration at the outlet of the reactor column is 4 – 5 ppm, and no difference is seen in the performance even after 150 hours.

Most of the conventional catalysts used in the catalytic reduction process for converting $NO_x$ with ammonia are metallic oxides, and reaction temperatures of about 250° to about 450° C are required. When the present catalyst is used, the reaction can proceed even at such a low temperature as 100° to 200° C.

In treating $NO_x$ in the combustion flue gas, $NO_x$ can be removed after dusts contained in the flue gas have been removed by means of the existing dust collector thanks to such low temperatures, and therefore a problem of catalyst bed clogging due to the dusts can be solved thereby. If the flue gas contains $SO_3$, a problem of melting adhesion of acidic ammonium sulfate resulting from the reaction of $SO_3$ with $NH_3$ can be also avoided.

Furthermore, even in treating the low temperature flue gas, an advantageous heat efficiency can be obtained thanks to the low reaction temperature.

In the present $NO_x$ treatment, a wide temperature range from such a low temperature as about 100° C to a considerably high temperature at which a catalyst structure is not changed is applicable.

The present catalyst can be prepared only by impregnating the carrier with an aqueous solution of the present catalyst component and drying the impregnated carrier, and thus its steps are very simple.

Cases of coexistence of an ammonium salt with the cuprous or cupric halides are described below.

Figure 3:
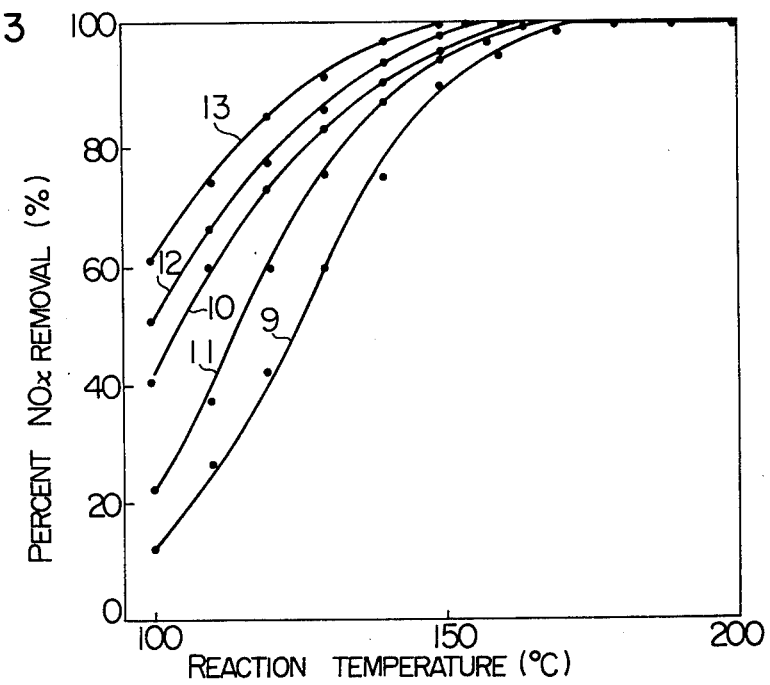
FIGS. 3 to 5 is graphs showing relations between reaction temperature and percent $NO_x$ removal of other catalysts of the present invention.

Dried alumina carriers in 12 – 20 mesh consisting of 90% of $Al_2O_3$ and 10% of $SiO_2$ are impregnated with solutions containing 5% by weight of $CuCl_2$, and $NH_4Cl$ at varied concentrations, and dried at 120° C for two hours. 300 cc of the resulting catalysts are filled in individual reactor tubes, and 4N l/min. of a gas containing 250 – 300 ppm of NO, 300 – 350 ppm of $NH_3$ 3% of $O_2$, 10% of $H_2O$ and the balance being $N_2$ is passed through the individual reactor tubes, while changing the temperature of the reaction section. $NO_x$ concentration is measured to determine changes in percent $NO_x$ removal by temperature for the individual catalysts containing $NH_4Cl$ at varied concentration. Results are shown in FIG. 3.

In comparison to curve 9 where $NO_x$ reacts with $NH_3$ in the flue gas over the catalyst free from $NH_4Cl$, curves 10 – 13, where the catalysts contain the ammonium salt ($NH_4Cl$ content: 0.5% by weight for curve 10, 1% by weight for curve 11, 2% by weight for curve 12, and 4% by weight for curve 13), are quite remarkable in the percent $NO_x$ removal.

EXAMPLE 2

Spherical alumina carriers in 4 – 6 mesh are impregnated with an aqueous solution containing 5% by weight each of $CuCl_2$ and $NH_4Cl$, and dried. 5 l of the resulting catalyst is filled in a column, 150 mm in inner diameter. 1.0 l/hr of ammonia gas is added to 15 $Nm^3/hr$ of boiler combustion flue gas containing 65 – 75 ppm of NO, 15% of $CO_2$, 4% of $O_2$, 17% of $H_2O$, and the balance being $N_2$, and the resulting mixed gas passed through the reactor column maintained at 135° C. $NO_x$ concentration at the outlet of the reactor column is about 6 – 7 ppm even after about 100 hours.

Cases of coexistence of a vanadium compound and/or a molybdenum compound with the copper halide are described below.

Catalyst 26 (CuCl + $NH_4VO_3$), catalyst 24 ($CuCl_2$ + $VOCl_2$), and catalyst 23 [$CuCl_2$ + $(NH_4)_6Mo_7O_{24}$] are prepared in the following manner.

Dried alumina gel carriers in 12 – 14 mesh are individually impregnated with aqqueous solutions containing individually 5% by weight of ammonium metavanadate, vanadyl tetrachloride and ammonium molybdenate, dried at 120° C for 2 hours, then impregnated with an aqueous solution containing 5% by weight of $CuCl_2$, and dried at 120° C for 2 hours.

On the other hand, catalyst 25 ($CuCl_2$ + $V_2O_5$) and catalyst 22 ($CuCl_2$ + $MoO_3$) are prepared in the following manner.

Said carriers impregnated individually with the aqueous solutions containing individually ammonium metavanadate and ammonium molybdate are heated at 400° C for 2 hours, then impregnated with an aqueous solution containing 5% by weight of $CuCl_2$, and dried at 120° C for 2 hours.

Figure 4:
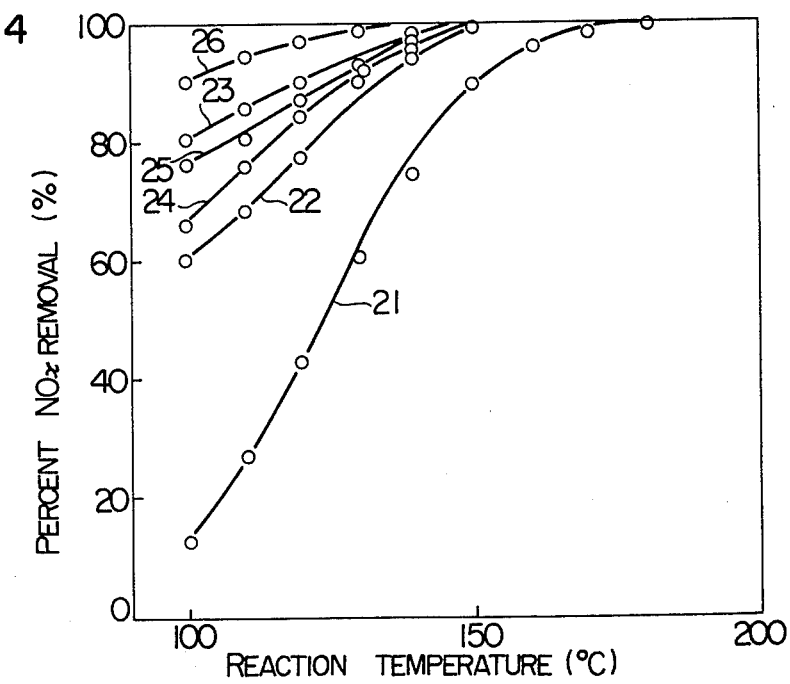

5 cc each of the resulting individual catalysts are filled in the individual reactor tubes, and 6 l/min. of a gas containing 300 ppm of NO, 300 ppm of $NH_3$, 3% of $O_2$, 10% of $H_2O$, and the balance being $N_2$ is passed through the reactor tubes while maintaining the reaction section at the various temperatures as shown in FIG. 4, and $NO_x$ concentrations at the outlets of the reactor tubes are continuously measured to determined percent $NO_x$ removals. The results are shown in FIG. 4.

In FIG. 4, the result of catalyst 21 containing only $CuCl_2$ is given for comparison.

It is seen from FIG. 4 that all of the present catalysts 22 to 26 have a high percent $NO_x$ removal even in a low temperature range, as compared with catalyst 21, and especially catalysts 26 and 23 containing individually ammonium salts of (meta)-vanadic acid and molybdenic acid are distinguished.

Percent $NO_x$ removal is determined similarly for catalysts 22 to 26 containing no $CuCl_2$, and it is found that percent $NO_x$ removal is almost zero in a temperature range of 100° to 150° C in all the cases.

It is seen from the foregoing fact that the vanadium compound or the molybdenum compound acts as a promotor and accelerate the reaction.

EXAMPLE 3

Spherical alumina carriers in 4 – 6 mesh are impregnated with an aqueous solution containing 5% by weight of $NH_4VO_3$, dried, then impregnated with an aqueous solution containing 5% by weight of $CuCl_2$, and dried at 150° C for 2 hours. 3 l of the resulting catalyst is filled in a reactor column, 150 mm in inner diameter.

1.0 l/hr of ammonia gas is added to 15 $Nm^3$/hr of boiler combustion flue gas containing 300 ppm of NO, 200 ppm of $SO_2$, 15% of $CO_2$, 4% of $O_2$, 17% of $H_2O$, and the balance being $N_2$, and the resulting mixed gas is passed through the reactor column at 120° C or less. $NO_x$ concentration at the outlet of the reactor column is as low as about 25 ppm even after 100 hours.

EXAMPLE 4

$NO_x$ removal is carried out in the same manner as in Example 3, except that silica gel carrier ($SiO_2$: 90%, $Al_2O_3$: 10%) is used in place of the alumina carrier. $NO_x$ concentration at the outlet of the reactor column is about 35 ppm even after 80 hours, and performance similar to that at the initial stage of operation can be maintained.

EXAMPLE 5

$NO_x$ removal is carried out in the same manner as in Example 3, except that $NH_4Mo_7O_{24}$ is used in place of $NH_4VO_3$. $NO_x$ concentration at the outlet of the reactor column is 28 – 30 ppm even after about 100 hours, and performance similar to that at the initial stage of operation can be maintained.

COMPARATIVE EXAMPLE $NO_x$ removal is carried out in the same manner as in Example 3, except that the catalyst contains no $NH_4VO_3$. $NO_x$ concentration at the outlet of the reactor column is 90 –95 ppm after about 100 hours, and performance is considerably lower than that of Example 3.

Ternary catalyst comprising a copper halide, an ammonium salt and an alkali metal halide is described below.

Figure 5:
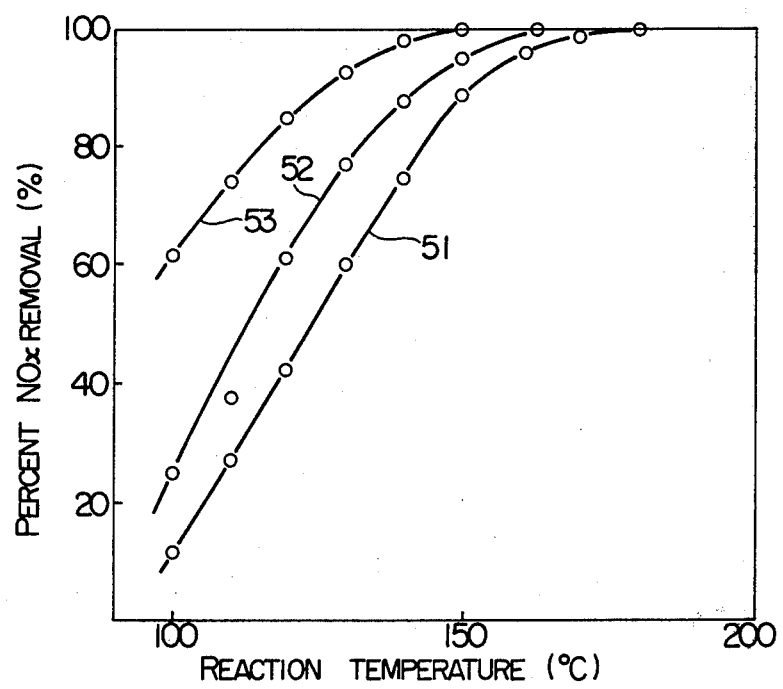

Silica gel carriers are impregnated individually with an aqueous suspension containing 5% by weight of $CuCl_2$, an aqueous suspension containing 5% by weight each of $CuCl_2$ and $(NH_4)_2SO_4$, and an aqueous suspension containing 5% by weight each of $CuCl_2$, $(NH_4)_2SO_4$ and NaCl, and dried at 120° C. The resulting individual catalysts are filled in individual reactor tubes, and maintained at various temperatures shown in FIG. 5. A gas containing 300 ppm of NO, 300 ppm of $NH_3$, 3% of $O_2$, 10% of $H_2O$, and the balance being $N_2$ is passed through the reactor tubes at a space velocity of 8,000 $hr^{-1}$. About 30 minutes after the catalyst has reached the stationary state at the respective temperatures, $NO_x$ concentration is measured to determine a percent $NO_x$ removal. The results are shown in FIG. 5. In FIG. 5, curve 51 is for the $CuCl_2$ catalyst, curve 52 for the $CuCl_2$ + $(NH_4)_2SO_4$ catalyst, and curve 53 for the $CuCl_2$ + $(NH_4)_2SO_4$ + NaCl catalyst.

As is apparent from FIG. 5, the addition of an alkali metal halide such as NaCl further improves the percent $NO_x$ removal.

EXAMPLE 6

Silica gel ($SiO_2$ : 100%, pore volume : 0.4 cc/g, surface area : 150 $m^2$/g) is dipped in an aqueous solution containing 2.5% by weight of cupric chloride, 2.5% by weight of ammonium sulfate, and 5.0% by weight of sodium chloride for one hour, dried at 150° C for 2 hours, and then subjected to performance evaluation test.

Gas composition:
  NO 300 ppm
  $NH_3$ 300 ppm
  $O_2$ 3%
  $H_2O$ 14%
  $N_2$ balance
Space velocity: 10,000 $hr^{-1}$
Reaction temperature: 150° C
Percent $NO_x$ removal: 100%

EXAMPLE 7

Same test as in Example 6 is carried out in the manner as in Example 6, except that silica gel having a pore volume of 0.55 cc/g and a surface area of 162 $m^2$/g is used as the carrier. Percent $NO_x$ removal of 100% is obtained at the reaction temperature pf 140° C.

EXAMPLE 8

Test is carried out with a flue gas containing sulfur oxide, using the same catalyst as used in Example 7.

Gas composition:
 NO 300 ppm
 $NH_3$ 300 ppm
 $O_2$ 3%
 $H_2O$ 10%
 $CO_2$ 12%
 $SO_2$ 200 ppm
 $SO_3$ 7 ppm
 $N_2$ balance Space velocity: 10,000 $hr^{-1}$ Reaction temperature: 140° C Percent $NO_x$ removal of 100% can be maintained even after about 100 hours, and no influence is given upon the percent $NO_x$ removal even if there coexists sulfur oxides.

In the foregoing Examples, disclosure is made only of NO as $NO_x$ because NO is the nitrogen oxide existing mainly in the flue gas. Other nitrogen oxide existing in the flue gas is $NO_2$, but $NO_2$ is contained usually in a very small amount in the flue gas, and is more reactive than NO. Thus, $NO_2$ can be readily removed in the same manner as for NO.

According to the present invention, $NO_x$ removal can be carried out at a lower temperature, which makes it possible to provide a more economical apparatus. Selection of a carrier for the catalyst is a function of various factors, such as economy, strength, performance, etc. and it is necessary to use a carrier that can meet the gas conditions.

What is claimed is:

1. A process for removing nitrogen oxides in a flue gas by conversion to nitrogen and water comprising adding ammonia gas to a flue gas containing nitrogen oxides and passing the resulting mixed gas over a catalyst of cuprous or cupric halide selected from the group consisting of cuprous chloride, cuprous bromide, cupric chloride, cupric bromide, and cupric iodide.

2. A process for removing nitrogen oxides in a flue gas by conversion to nitrogen and water comprising adding ammonia gas to a flue gas containing nitrogen oxides and passing the resulting mixed gas over a catalyst of cuprous or cupric halide selected from the group consisting of cuprous chloride, cuprous bromide, cupric chloride, cupric bromide, and cupric iodide in the presence of oxygen.

3. A process according to claim 1, wherein the catalyst contains an ammonium salt in addition to the cuprous or cupric halide.

4. A process according to claim 1, wherein the catalyst contains a vanadium compound or molybdenum compound in addition to the cuprous or cupric halide.

5. A process according to claim 3, wherein the catalyst contains an alkali metal halide in addition to the cuprous or cupric halide and the ammonium salt.

6. A process according to claim 1, wherein the cuprous or cupric halide is adsorbed on a porous carrier selected from silica gel, silica-alumina gel, alumina, or activated carbon.

7. A process according to claim 1, wherein said catalyst is cuprous chloride.

8. A process according to claim 1, wherein said catalyst is cupric chloride.

9. A process according to claim 2, wherein said catalyst is cuprous chloride.

10. A process according to claim 2, wherein said catalyst is cupric chloride.

11. A process according to claim 1, wherein said mixed gas is passed over said catalyst at a temperature of 100° C or higher.

12. A process according to claim 11, wherein said mixed gas is passed over said catalyst at a temperature in the range of 100° to 150° C.

13. A process according to claim 2, wherein said mixed gas is passed over said catalyst at a temperature of 100° C or higher.

14. A process according to claim 13, wherein said mixed gas is passed over said catalyst at a temperature in the range of 100° to 150° C.

15. A process according to claim 3, wherein said ammonium salt is ammonium chloride or ammonium sulfate.

16. A process according to claim 4, wherein said vanadium compound is selected from the group consisting of vanadium oxides, vanadium oxyhalides, and metavanadates.

17. A process according to claim 16, wherein said metavanadate is ammonium metavanadate.

18. A process according to claim 4, wherein said molybdenum compound is selected from the group consisting of molybdenum oxides, molybdenum halides, molybdenum oxyhalides and ammonium molybdate.

19. A process according to claim 18, wherein said molybdenum compound is ammonium molybdate.

20. A process according to claim 5, wherein said alkali metal halide is sodium chloride.

* * * * *